July 15, 1924.　　　　　　　　S. TALISMAN　　　　　　　　1,501,378
ANIMAL TRAP
Filed Dec. 29, 1921
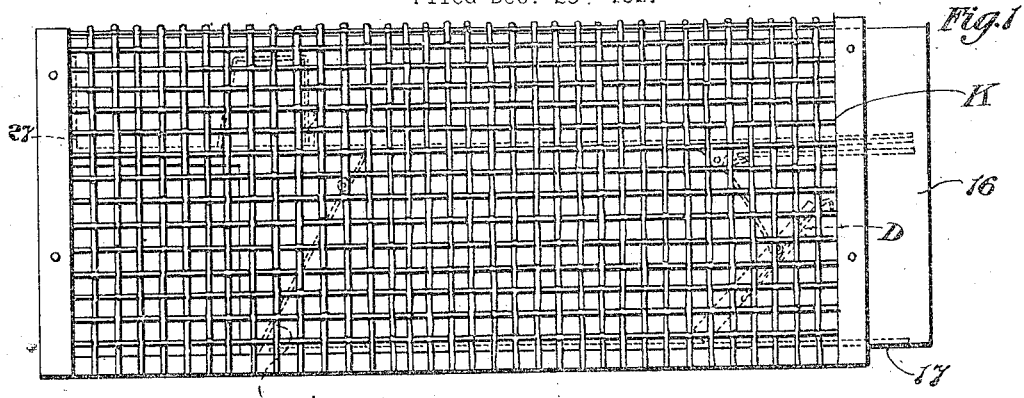
Fig.1
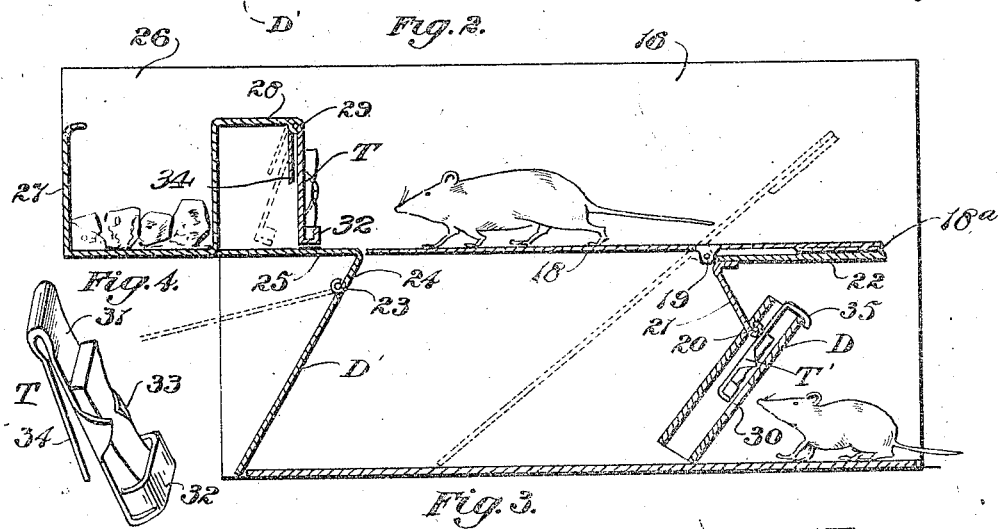
Fig.2
Fig.4
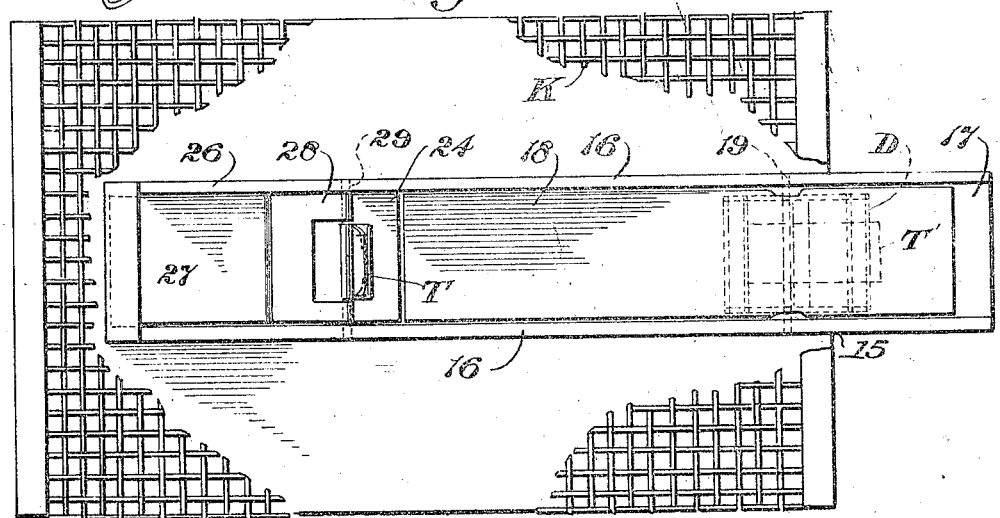
Fig.3
Inventor:
S. Talisman
by Hazard & Miller
Attys.

Patented July 15, 1924.

1,501,378

UNITED STATES PATENT OFFICE.

SAMUEL TALISMAN, OF SAN BERNARDINO, CALIFORNIA.

ANIMAL TRAP.

Application filed December 29, 1921. Serial No. 525,555.

*To all whom it may concern:*

Be it known that I, SAMUEL TALISMAN, a citizen of the United States, residing at San Bernardino, in the county of San Bernardino and State of California, have invented new and useful Improvements in Animal Traps, of which the following is a specification.

My invention relates to animal traps, and a purpose of my invention is the provision of an animal trap of extremely simple, durable and efficient construction which is self set and ever set.

I will describe one form of animal trap embodying my invention and will then point out the novel features thereof in claims.

In the accompanying drawings,

Figure 1 is a view showing in side elevation one form of trap embodying my invention.

Fig. 2 is a vertical central longitudinal sectional view of the trap shown in Fig. 1.

Fig. 3 is a top plan view of the trap with a portion thereof broken away.

Fig. 4 is an enlarged detail perspective view of one of the bait trays comprised in the preceding views.

Referring specifically to the drawings in which similar reference characters refer to similar parts, my invention, in its present embodiment, comprises a cage designated generally at K which is formed with a wire top and sides, with one end wall thereof provided with an opening 15 through which a trap section is adapted to be inserted into or withdrawn from the cage. This trap section, as clearly shown in Fig. 2, comprises side walls 16 and a bottom wall 17, and between the side walls 16 is arranged a tilting platform 18 pivoted on a pin 19 and normally urged to a horizontal position by means of a weight $18^a$. A door designated generally at D is mounted for swinging movement upon a pin 20 carried by a partition 21 secured to a plate 22, the latter being fixedly sustained between the side walls 16. At the forward or inner end of the platform 18 a door D' is hingedly supported on a pin 23 sustained in the depending lip 24 of a plate 25 secured between the side walls 16. The walls 16 are provided at their rear ends with extensions 26 between which is secured a food tray 27 provided with an extension 28 carrying a pin 29 for hingedly supporting a bait tray designated generally at T.

As shown in Fig. 2, the door D is hollow to accommodate a bait tray T', access being had to the tray through an opening 30. The trays T and T' are constructed in substantially the same manner in that they include a plate 31 having a base flange 32 and bendable tongues 33 adapted to co-act with the flange in securing a piece of bait within the tray in the manner clearly shown in Fig. 4. The bait tray T is provided with an extension 34 which is bent upon the plate 31 to provide a support for swingingly sustaining the tray as a unit upon the pin 29. The bait tray T' is removably fitted within the door D and is provided with a lip 35 adapted to engage the upper end of the door for retaining the tray in proper position with respect to the opening 30.

In the operation of the trap, the smaller animals are adapted to enter the trap section beneath the plate 22, and in seeking to obtain the bait contained on the tray T', elevate the door D whence they are free to pass through and out of the trap section by the door D' and ultimately into the cage K. By reference to Fig. 2 it will be seen that the doors D and D' are supported on an incline so that they can be opened only in one direction thus preventing the return passage of the animal through the trap section.

The larger animals are induced to the tilting platform 18 by the bait contained in the tray T and odoriferous food adapted to be placed within the tray 27. The animal upon alighting on the short arm of the platform 18 moves toward the bait tray T, and by virtue of the weight $18^a$, the animal does not effect a tilting of the tray until it is within close proximity of the bait tray T. The weight $18^a$ may be so designed as to allow of the animal actually touching the bait contained in the tray, but upon attempting to bite the same, the tray will swing rearwardly as shown in dash lines in Fig. 2 thus actually preventing the animal from consuming the bait. It will be understood that when the animal reaches the inner end of the platform it will be tilted downwardly to the dotted line position shown, thereby depositing the animal between the doors D and D' where it ultimately finds entrance to the cage of the trap through the door D'.

Although I have herein shown and described only one form of animal trap embodying my invention, it is to be understood that various changes and modifications may be made herein without departing from the spirit of the invention and the spirit and scope of the appended claims.

I claim as my invention:

1. An animal trap comprising a cage, and a trap section removably fitted in the cage and including a tilting platform normally urged to a horizontal position, a bait tray swingingly supported in the same plane as the platform and at one end thereof, and doors beneath the platform mounted to swing in one direction only one of said doors allowing the entrance of an animal to the trap section beneath the platform, and the other door allowing the entrance of an animal to the cage from the trap section.

2. An animal trap comprising a cage, and a trap section removably fitted in the cage and including a tilting platform normally urged to a horizontal position, a bait tray swingingly supported in the same plane as the platform and at one end thereof, doors beneath the platform mounted to swing in one direction only, and a food chamber in the rear of the bait tray for the purpose described.

3. An animal trap comprising a cage and a trap section removably fitted in the cage and including doors controlling the passage through the trap section and into the cage, said doors being mounted for swinging movement in one and the same direction, a bait tray carried by one of the doors, a platform mounted for tilting movement above and between the doors, and a second bait tray mounted for swinging movement at a point spaced from the inner end of the platform.

4. An animal trap comprising a cage and a trap section removably fitted in the cage and including doors controlling the passage through the trap section and into the cage, said doors being mounted for swinging movement in one direction only, a bait tray carried by one of the doors, a platform mounted for tilting movement above and between the doors, a second bait tray mounted for swinging movement at a point spaced from the inner end of the platform, and a food chamber in the rear of the second bait tray for the purpose described.

5. In combination, a hollow door mounted for swinging movement in one direction, and formed with an opening, a bait tray insertable into the door and disposed adjacent said opening, and an extension formed on the bait tray, said extension engaging the door for sustaining the bait tray in proper position with respect to the opening.

6. An animal trap comprising a cage and a trap section removably fitted in the cage and including doors controlling the passage through the trap section and into the cage, said doors being mounted for swinging movement in one direction only, a bait tray carried by one of the doors, a platform mounted for tilting movement above and between the doors, and a second bait tray mounted for swinging movement at a point spaced from the inner end of the platform.

7. In combination, a hollow door mounted for swinging movement and provided with an opening, and a bait tray sustained within the door and adapted to expose the bait within said opening.

In testimony whereof I have signed my name to this specification.

SAMUEL TALISMAN.